Patented Aug. 17, 1954

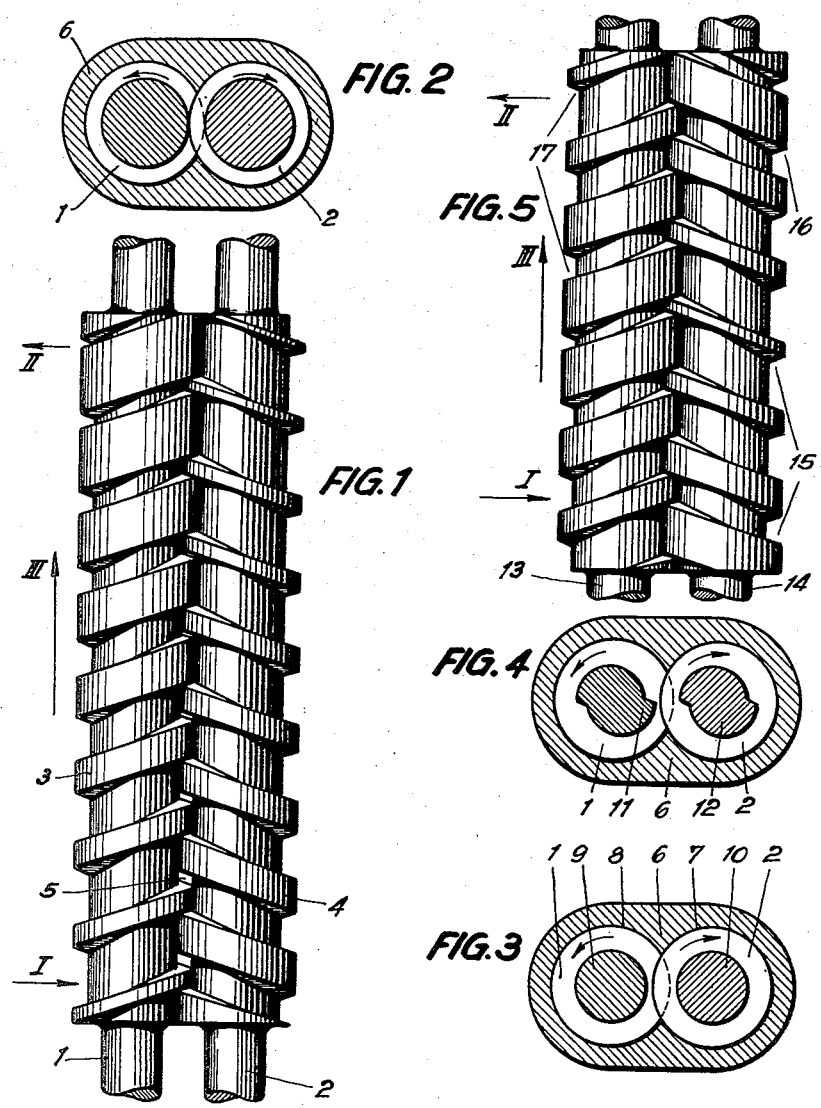

2,686,336

UNITED STATES PATENT OFFICE 2,686,336

KNEADING PUMP

Fritz Kleinlein, Furth (Bay), and Max Bernhardt, Nurnberg, Germany, assignors to Maschinenfabrik Paul Leistritz, Nurnberg, Bavaria, Germany Application November 23, 1951, Serial No. 257,720

7 Claims. (Cl. 18—12)

Known kneading pumps for continuously kneading and at the same time conveying highly viscous or plastic materials against high pressure, for instance through adjacent or succeeding homogenising means, are based on the co-operation between two or more worm spindles having large grooves, engaging with another in the manner of toothed members and rotating in the same direction in some cases and in opposite directions in others. Such pumps employ worms having wide grooves which are cut according to an approximately rectangular basic profile, and of which the leads of the two helical surfaces are not the same, so that the resultant lands or ridges are wide at one end of the worm and narrow at the other. This produces changes in volume along the direction of conveying, which cause the material to be crushed to and fro between the flanks of the worms and in this manner knead the material without any danger of clogging.

It is therefore an object of the present invention to provide a worm press for kneading and conveying plastic masses that embodies two mutually engaging, reversely rotatable screw or worm members with the feed volume of one member increasing in a direction away from the inlet end to the same extent as the volume of the other member decreases.

It is further an object to provide such an arrangement in which the lands and grooves of the worm members have such pitch and size relationship as to in plan provide rectangular slits or openings continuously decreasing in axial extent of the members from the inlet end.

It is further a broad object to provide a kneading or worm press which results in an extraordinarily thorough working of the mass being conveyed.

Further and more specific objects will be apparent from the accompanying drawings, in which:

Figure 1 is a plan view of the worm members of the press and illustrating the one form of arrangement of the lands and grooves on the respective worm members, Figure 2 is a sectional view at right angles to the axis of the worm members of Figure 1, Figure 3 is a sectional view of a modification in which the core diameters of the worms is relieved or backed off to facilitate the handling of more viscous or heavy material, Figure 4 is a cross-sectional view of a further modification in which the cores of the worm members are relieved or backed off to provide toothed formation to impart a milling action during kneading and conveyance of a plastic mass; and, Figure 5 is a plan view similar to Figure 1 but illustrating a modification in which the land and groove arrangement of the respective worm members are in stages of variable volumetric capacity on each worm member.

The present invention also employs worm spindles of this kind which however are formed in a new way and combined in a novel manner, as illustrated in Figures 1 to 4. In kneading pumps of known types, either at the intake end the volume of the groove is greatest and equal in both worms, the intervals between the flanks being very large, whereas at the delivery end the said volume is reduced to about one-half of its size at the intake end, or else the two worms engage with one another from the intake end to the delivery end in such a manner that the volume or conveying capacity of the groove of the main worm decreases in the direction of conveying whereas the volume or conveying capacity of the groove of the secondary worm increases in this direction.

In contradistinction to the above, according to the invention a compromise is adopted which ensures advantageous kneading and at the same time efficient intake of the material. Figure 1 diagrammatically illustrates the manner of engagement and the form of the grooves of the two worms, and Figure 2 is a cross section at right angles to the axis, illustrating the manner in which the worms are combined and accommodated in the casing. The worm 1 is cut with a right-handed thread, the two helical surfaces having different leads or pitches so that the volumetric conveying or delivery capacity of the groove decreases from the intake end I to the delivery end II. The worm 2 on the other hand has a left-handed thread and therefore rotates in the opposite direction, and is cut in such a manner that the volumetric conveying or delivery capacity of the groove increases from the intake end to the delivery end, in the direction of the arrow III; the end of each worm may be formed in the manner of a rotary pump.

Therefore, as the material is conveyed continuously in the direction of the arrow III it will be progressively forced out of the narrowing groove of the spindle 1 into the widening groove of the spindle 2. The novel feature is that in the intake part and far beyond the longitudinal centre of the machine, or even right up to the end, the profile gaps and ridges or teeth of the two worms are not in close engagement with one another. For instance, between the ridge or tooth 3 of the worm 1 and the profile gap 4 of the worm 2 there is a gradually decreasing space 5 of rectangular cross-section analogous to the nip of a roll train. The size of these spaces becomes continually smaller as the material, moving in the direction of conveying, is progressively plasticised and thoroughly kneaded. In this manner, not only is the material passing through this space very violently kneaded, but also the adjacent parts of the material which are already in the worm 2 are violently intermixed and stirred up. The arrangement as a whole has the advantage of drawing in the material in a very advantageous manner by means of two open spindles in the feed or intake in.

In the case of heavy hard materials the first stage of treatment may be assisted by cutting down or reducing the bottom diameter of one or both worms, as shown by the cross-sectional illustration in Figure 3. Figure 3 is a diagrammatic illustration showing the interengagement, the casing being the same as in Figure 2. The bottom diameters of the two worms are reduced to cylinders 9 and 10 respectively. This gives rise to additional rolling of the material between the outer surfaces 7 and 8 and the bodies 9 and 10 respectively. To ensure complete tightness, the bottom or core diameter can then be made to increase towards the delivery end III, where the clearance will be the minimum required by normal workshop practice, in order to produce a satisfactory high-pressure effect. Figure 4 shows, by way of example, body or core cross-sections 11 and 12 which are relieved or backed off so that they are in the form of toothed cylinders. In the example illustrated in cross section in Figure 4, the core bodies 11 and 12 of the two screws or worms 1 and 2 in the same casing 6 are set back so that their shape is like that of toothed cylinders. The milling action occurring during rotation as a result of this additional change of cross section is specially advantageous for many purposes. Obviously other modifications, known in the construction of toothed cylinders of the cross section of the worm bodies 11 and 12 may be employed, more especially for instance the numbers of projecting parts in the cross-sections of the two worm bodies may be made unequal.

The rolling action will be intensified further if, as shown in Figure 5, each of the screws or worms 13 and 14 of which the construction is in principle the same as in Figure 1 including constant diameter cores, is cut so as to comprise a plurality of stages according to the invention, in such a manner that the worm 14 is provided with a groove 15 which first of all widens and then continues in the form of a narrowing groove 16 in the axial direction away from the inlet end. This groove arrangement forces the conveyed material back into the continuation or groove 17 of the worm 13 which is of opposite form, that is it is provided with a groove which first narrows and then widens in the same axial direction. This zig-zag guiding and crushing of the material may be repeated several times.

It is thus clear that the present invention provides a worm press for kneading and conveying plastic masses. This worm press comprises two mutually engaging, reversely rotatable screws or worms which are of course mounted in parallelism with one end constituting an inlet end for the material to be kneaded. The screws have constant diameter cores and inter-engaging lands and grooves, the latter being of rectangular basic profile. As shown in Figure 1 the grooves of screw 1 are of progressively decreased axial extent while the lands thereof are of progressively increased axial extent away from the inlet end and the grooves of the other screw 2 are of progressively increased axial extent while the lands thereof are of progressively decreased axial extent in the same direction and the progressive difference in axial extent of the lands and grooves of one screw being of greater degree than that of the other so as to provide, as viewed in plan, the substantially rectangular openings 5 between the meshing lands and grooves of the respective screws and as clear in the drawings these openings progressively decrease in area in the direction away from the inlet end of the screws.

The arrangement shown in Figure 5, which is highly effective to provide an extraordinarily thorough working or kneading of the plastic mass, the lands and grooves of screw 13 are of respective progressive increasing and decreasing axial extent throughout one portion thereof and of respective progressive decreasing and increasing axial extent throughout a succeeding portion to provide stages throughout the length of the screw. The inter-engaging other screw 14 has its land and groove relationship reversed so that throughout the first portion in the direction away from the feed and the lands and grooves are of respective decreasing and increasing axial extent and then throughout a succeeding portion the lands and grooves of this screw 14 are of respective progressive increasing and decreasing axial extent.

We claim:

1. A kneading press for kneading and conveying materials of high viscosity or plasticity including two inter-engaging and oppositely rotating worms having a screw surfaces and feed end, said worms respectively having varying volumetric conveying capacity with the volumetric conveying capacity of one worm decreasing in a direction away from the feed end and the volumetric conveying capacity of the other worm increasing in the direction away from the feed end, the pitch of the screw surfaces at the feed end of the worms and in the direction extending away therefrom providing in plan a rectangular slot between adjacent lands of the respective worms and said slots extending throughout more than one-half of the axial extent of the length of the worms and the area of said slots continuously decreasing in a direction away from the said feed end.

2. A worm press for kneading and shaping materials of high viscosity or plasticity including two oppositely rotating worms having inter-engaging lands and grooves and having a feed end, the lands and grooves having such pitch an axial extent as to provide a variation in the volumetric conveying capacity of the worms with the volumetric conveying capacity of one worm decreasing in the direction away from the feed end and the volumetric conveying capacity of the other worm increasing in the direction away from the feed end and said worms being further characterized by the fact that the variation of volumetric conveying capacity is in sectional stages with relation to the axial extent of the worms including plural stages of varying conveying capacity arranged successively behind one another in a direction away from the feed end, each worm including at least one stage of an increasing volumetric conveying capacity and an adjacent stage and an adjacent stage of a decreasing volumetric conveying capacity and the pitches of the lands and grooves throughout the half length of a stage being such as to present in plan a rectangular slot between adjacent lands and grooves of the respective worms.

3. A worm press according to claim 2 thereby characterized that the rectangular slot continuously decreases from the beginning of each stage toward the middle thereof.

4. A worm press according to claim 3 thereby characterized that the worms for core surfaces are constituted by surfaces of revolution connected to one another by relieved portions.

5. A worm press according to claim 4 thereby characterized that relieved portions of the core surfaces provide a toothed formation on each worm.

6. A worm press for kneading and conveying plastic masses comprising two mutually engaging reversely rotatable screws mounted in parallelism and having a feed end, said screws including constant diameter cores and having lands and grooves of rectangular basic profile, with the grooves of one screw being of progressively decreased axial extent while the lands thereof are of progressively increased axial extent in the direction away from the feed end and the grooves of the other screw being of progressively increased axial extent while the lands thereof are of progressively decreased axial extent in the same direction and the progressive difference in axial extent of the lands and grooves of one screw being of greater degree than that of the other to provide in plan substantially rectangular openings between the meshing lands and grooves of the respective screws and which openings progressively decrease in area in the direction away from the inlet end of the screws.

7. A worm press as defined in and by claim 6 in which the lands and grooves of one screw are of respective progressive increasing and decreasing axial extent through one portion of the axial extent of the screw and of respective progressive decreasing and increasing axial extent throughout a succeeding portion of the screw while the lands and grooves of the other screw are of respective decreasing and increasing axial extent throughout the first portion thereof adjacent said one portion and of respective progressive increasing and decreasing axial extent throughout the portion thereof adjacent said succeeding portion.

References Cited in the file of this patent

UNITED STATES PATENTS

| Number | Name | Date |
|---|---|---|
| 98,035 | Coignet | Dec. 21, 1869 |
| 155,602 | Wiegand | Oct. 6, 1874 |
| 2,119,162 | Hartner | May 31, 1938 |

FOREIGN PATENTS

| Number | Country | Date |
|---|---|---|
| 232,413 | Switzerland | Aug. 16, 1944 |